L. BAILEY & S. D. SARGENT.
Improvement in Carpenters' Bevels.
No. 124,779. Patented March 19, 1872.
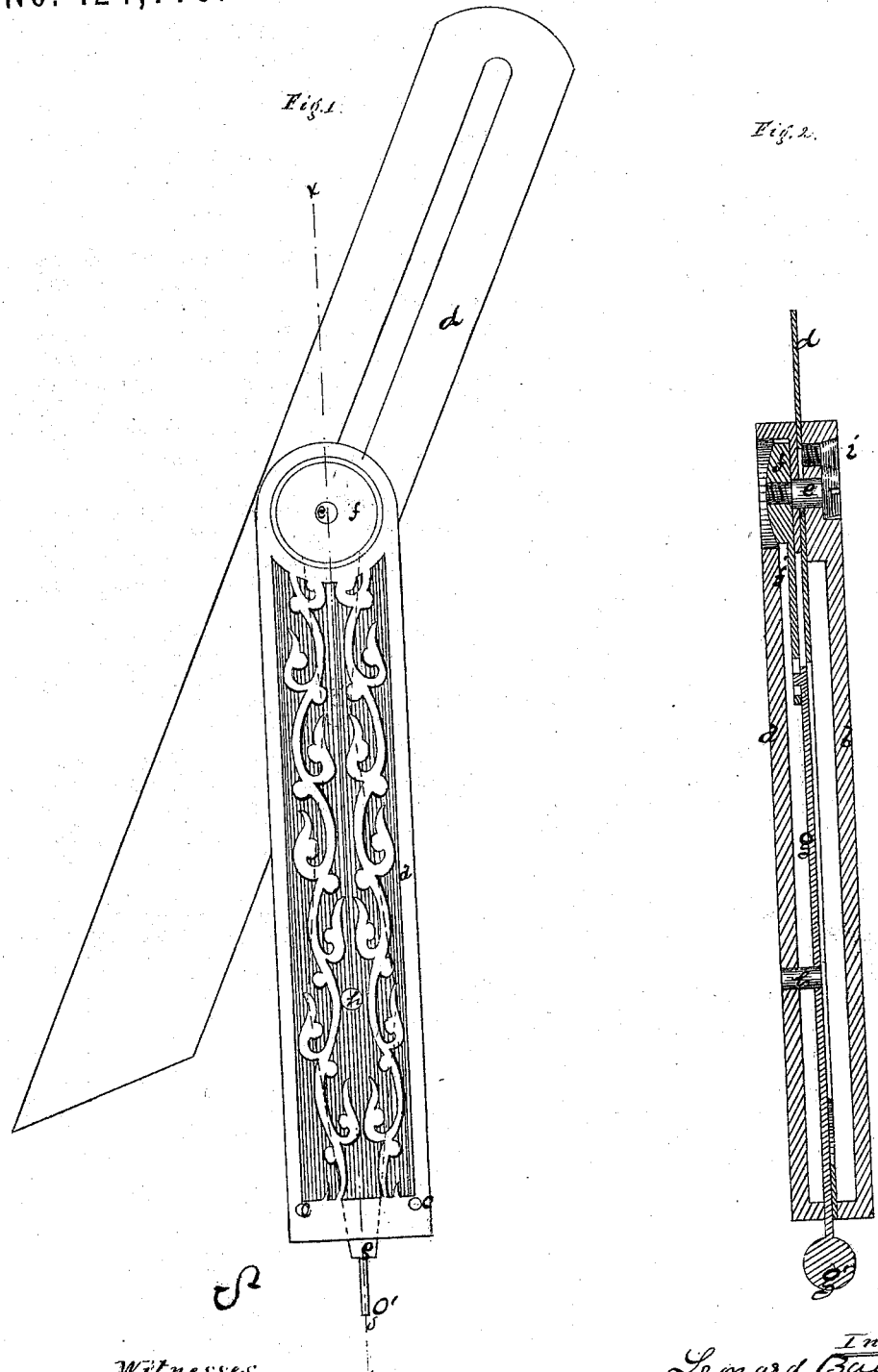

124,779

UNITED STATES PATENT OFFICE.

LEONARD BAILEY AND SAMUEL D. SARGENT, OF NEW BRITAIN, CONN.

IMPROVEMENT IN CARPENTERS' BEVELS.

Specification forming part of Letters Patent No. 124,779, dated March 19, 1872.

SPECIFICATION.

We, LEONARD BAILEY and SAMUEL D. SARGENT, of New Britain, in the county of Hartford and State of Connecticut, have invented certain new and useful Improvements in Carpenters' Bevels, of which the following is a specification, reference being had to the accompanying drawing, in which—

Figure 1 is a side view, and Fig. 2 is a transverse lengthwise section through the dotted line $x\ x$.

The invention relates to an improved method of grasping or setting the blade.

The body is made, preferably of metal, in two parts, $a$ and $b$, which fit flatly together, leaving the interior hollow. These parts are fastened together at their butts by the rivets $c$. The letter $d$ indicates the blade, slotted as usual, and this slot traveling on the screw-pin $e$, which is driven through from the face of the pivot $b$ into the bottom nut $f$, which turns in a circular depression made for it in the part $a$. To this nut is attached an arm, $f'$, running down within the interior of the hollow body, and pivoted to the end of the lever $g$, which is pivoted on the pin $h$, and has a thumb-piece, $g'$, at its lower end, by which the lever may be worked. The outline of these two levers is shown by dotted lines in Fig. 1.

It will be readily understood that when the thumb-piece $g'$ is moved back and forth the nut $f$ will be rotated partially. When the thumb-piece is moved toward the letter S the nut is run up on the screw, and when the thumb-piece is moved in the opposite direction the nut is run down or toward the head of the screw-pin $e$, and in thus running down it draws the ends of the two parts $a$ and $b$ together, so as to lightly pinch and hold the blade in the position it may then be. The movement of the thumb-piece toward the S unlocks the blade. The pitch of the screw on the pin $e$ is very sharp, so that a very slight movement of the nut will lock or unlock the blade. The pin is kept from turning by the screw $i$ driven into the part $b$ close to the head of the pin, so as to pinch and hold it fast.

It will be observed that this bevel is perfectly flat upon both sides, there being no projection therefrom, thereby allowing it to be laid flat down on either side.

We claim as our invention—

As parts of a carpenter's bevel, the screw-pin $e$, combined with the nut $f$, the latter operated by lever connection extending down into or through the length of the handle, substantially as described, and for the purpose set forth.

LEONARD BAILEY.
SAMUEL D. SARGENT.

Witnesses:
AUSTIN HUNT,
A. H. ROGERS.